United States Patent Office 3,364,405
Patented Jan. 16, 1968

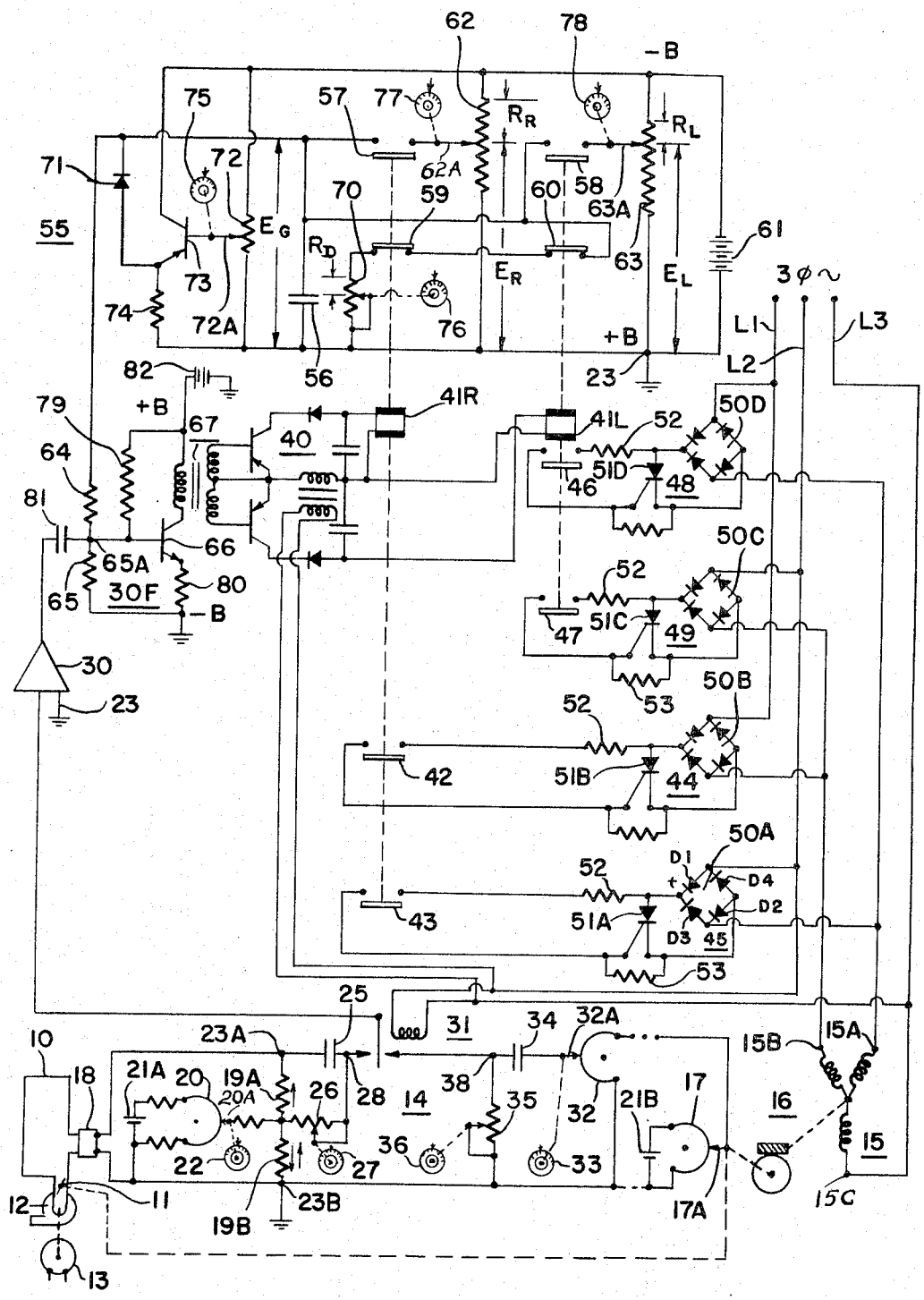

3,364,405
POSITION-CONTROL SYSTEM WITH IMPULSE FEEDBACK
Rolland H. Henderson, North Wales, Pa., assignor to Leeds & Northrup Company, Philadelphia, Pa., a corporation of Pennsylvania
Filed Apr. 27, 1964, Ser. No. 362,640
15 Claims. (Cl. 318—18)

ABSTRACT OF THE DISCLOSURE

A system for controlling a reversible motor in order to minimize deviations of a controlled variable from a desired value. The system includes a motor control circuit having an amplifier that has two output circuits which include directional relays. An impulse feedback loop between the amplifier outputs and at least one stage of the amplifier includes two charging circuits for capacitance means. The two charging circuits are respectively closed by normally open contacts of the directional relays for charging at independently adjustable rates depending upon which of the relays is energized. The discharge circuit of the capacitance means is completed by normally closed contacts of the directional relays and includes resistance means adjustable to preset the pulse repetition frequency. Thus, the motor is pulsed on and off in a repetitive manner, always in a direction to reduce the deviations of the controlled variable.

---

This invention relates to control systems in which a motor-driven final-control element is repositioned to minimize deviations of a controlled variable from a set-point, and particularly relates to arrangements providing for pulse-excitation of the motor drive.

In accordance with the present invention, the pulse-excitation of the motor drive has one or more of the following features: the pulse-width decreases at different independently-preset rates for the opposite directions of approach of the final-control element to a new balance position; the repetition-frequency of the pulses may be preset over a wide range; and the transition from continuous-excitation to pulse-excitation of the motor drive may be preset to occur when the final-control element reaches a desired predetermined distance from its balance position.

More particularly, the motor-control system includes an amplifier having an AC signal input with components respectively derived from deviations from set-point and from position of the final-control element. Two output circuits of the amplifier include directional relays which control the energization and direction of rotation of the drive-motor, specifically a three-phase motor. An impulse feedback loop between the amplifier outputs and at least one stage of the amplifier includes two charging circuits for capacitance means included in a gain-control network for the amplifier. The two charging circuits are respectively closed by normally-open contacts of the directional relays for charging at independently adjustable rates depending upon which of the relays is energized. The discharge circuit of the capacitance means is completed by normally closed contacts of the directional relays and desirably includes resistance means adjustable to preset the pulse-repetition frequency. A diode and an adjustable back-biasing means therefor are effectively connected across the capacitance means to preset a minimum AC input level for the amplifier and above which the selected directional relay is continuously energized by the amplifier output.

The invention further resides in a position-control system having new and useful circuit features hereinafter described and claimed.

The attached figure of drawing is explanatory of a position-control system incorporating the invention.

For purposes of explanation, it will be assumed the control variable is the pressure in the furnace-chamber of boiler 10 and that the final-control element is damper 11 in the air intake of the induced draft fan 12 continuously driven by motor 13. To maintain the furnace pressure at a desired value corresponding with the set-point of controller 14, the damper 11 is subject to repositioning adjustment by the reversible motor 15. For such purpose, the motor 15 is mechanically coupled via speed-reducer 16 to damper 11; it is also coupled to the adjustable element of slidewire 17 to provide a feedback signal applied during adjustment of damper 11 as one of the inputs of controller 14.

Another input for controller 14 is provided by the pressure-responsive transducer 18 which may be of type disclosed in copending application, Ser. No. 101,736, filed Apr. 10, 1961 and upon which has issued Letters Patent 3,226,639. The current supplied by transducer 18 to the potential-divider resistors 19A–19B of controller 14 is representative of the existing furnace pressure. An opposing reference-current is supplied to resistor 19B from the network including slidewire 20 and voltage source 21A. The calibrated dial 22 is coupled to slidewire 20 or its relatively adjustable contact 20A for presetting the reference-current at a set-point value corresponding with the desired boiler-pressure to be maintained.

When the pressure is at set-point, terminal 23A of the controller is at the same potential as the common or ground terminal 23B; when the pressure deviates above or below set-point, terminal 23A becomes positive or negative with respect to terminal 23B depending upon the sense of the deviation. The magnitude of the potential difference or voltage between terminals 23A, 23B corresponds with the extent of the deviation. The controller also preferably includes a network comprising capacitor 25 and resistor 26 to derive, from such deviation signal, a rate signal of magnitude proportional to the rate of change of the deviation signal. The resistor 26 is adjustable, as by dial 27, to preset the rate action of controller 14. Thus, under steady-state conditions with the pressure at set-point, the signal at terminal 28 of the controller is zero; but upon occurrence, and during existence, of a pressure-deviation from set-point, the signal at terminal 28 of the controller is of polarity and magnitude depending upon the sense, magnitude and rate of change of the pressure-deviation; for brevity, such composite signal is termed a deviation signal. This signal is applied to the amplifier 30, preferably of solid-state type, during one-half of each of the successive cycles of the synchronous modulator 31 which may, as shown, be of the vibrating reed type. During the other half of each of the successive cycles of modulator 31, there is applied to amplifier 30, during repositioning of damper 11, a feedback signal derived from the network including the damper-position slidewire 17 and its voltage source 21B.

The slidewire 32 is connected between one terminal of slidewire 17 and its relatively adjustable contact 17A. Consequently, the voltage across the slidewire 32 corresponds with the position of damper 11. Any desired fraction of the total voltage across slidewire 32 may be selected for control purposes by correspondingly setting its relatively adjustable contact 32A as by proportional-band dial 33. The selected fraction of the voltage across slidewire 32 is applied to the reset network comprising capacitor 34 and resistor 35, the latter being adjustable as by dial 36 to predetermine the reset action of controller 14.

Under steady-state conditions with motor 15 at rest, no signal appears at terminal 38 of the controller for application to amplifier 30 via modulator 31. During repositioning of damper 11, the signal at terminal 38 is of polarity corresponding with the direction of rotation of motor 15 and is of magnitude dependent upon the motor speed and upon the settings of the proportional-band and reset dials 33, 36. The optimum settings for these dials and for the rate dial 27 may be made in initial tuning of the controller to the particular installation.

Upon occurrence of a deviation from set-point and until the motor comes to rest with the damper 11 in a new balance position with pressure restored to the set-point, the input to amplifier 30 from modulator 31 as an AC signal whose phase depends upon the sense of the deviation and whose magnitude is related to the existing pressure-deviation and the change in damper position required to restore the pressure to set-point. The AC output of the final amplifier stage 30F is applied to a phase-sensitive discriminator 40 whose two output circuits respectively include one or the other of the directional relays 41R, 41L. These relays are of sensitive fast-acting type.

Upon energization of directional relay 41R, its normally-open contacts 42, 43 are pulled in respectively to trigger the solid-state switches 44, 45 to conductive state so to effect rotation of motor 15 in direction to move the damper 11 toward its open-position limit. Conversely, upon energization of relay 41L, its normally-open contacts 46, 47 are pulled in respectively to trigger the solid-state switches 48, 49 to conductive state so to effect rotation of the motor 15 in reverse direction for adjustment of damper 11 toward its closed-position limit. Since all of the switches 44, 45–48, 49 are similar in composition, it will suffice to describe one of them in detail.

The switch 45 comprises four diodes D1–D4, poled as shown, to form a rectifier bridge 50A connected between terminal 15A of motor 15 and conductor L2 of three-phase power line. The anode and cathode electrodes of a silicon-controlled rectifier (SCR) 51A are respectively connected to the + and − terminals of the bridge 50A. With contact 43 of relay 41R in closed-circuit position, DC current pulses flow from the positive to negative terminals of bridge 50A through resistors 52, 53 to apply a positive triggering voltage to the gate electrode of SCR 51A during both halfwaves of the power-line frequency. Thus, so long as relay 41R remains energized, the solid-state switch 45 is closed to connect motor terminal 15A to power-line conductor L2, and solid-state switch 44 is similarly closed to connect motor terminal 15B to power-line conductor L1.

In like manner, when directional relay 41L is energized, it triggers the solid-state switches 48, 49 respectively to connect motor terminal 15A to power-line conductor L1 and terminal 15B to power-line conductor L2. In consequence of the reversal of two phases of the line current supplied to it, the motor now rotates in reverse direction. As indicated in the drawing, the motor terminal 15C remains connected to power-line conductor L3 regardless of which pair of power switches is closed.

The impulse feedback circuit 55 now described provides for pulsing of the excitation of motor 15 to obtain high accuracy of positioning of the final-control element for both directions of its adjustment. The capacitor 56 has two charging circuits respectively including the normally-open contacts 57, 58 of the directional relays 41R, 41L and a discharge circuit including the normally-closed contacts 59, 60 of those relays. Charging current for capacitor 56 is supplied from battery 61 or other DC voltage source via one or the other of the voltage-divider resistors 62, 63 depending upon which of relays 41R, 41L is in energized state.

Upon energization of relay 41R, the voltage $E_G$ across capacitor 56 rises toward a value $E_R$ determined by the position of contact 62A of resistor 62 and at a rate dependent upon the time-constant $CR_R$ of capacitor 56 and that fraction of resistor 62 which is in series with capacitor 56 and the voltage source 61.

Upon energization of directional relay 41L, the voltage across capacitor 56 rises toward an independently selected value $E_L$ determined by the setting of contact 63A of resistor 63 and at a rate dependent upon the time-constant $CR_L$ of capacitor 56 and that fraction of resistor 63 which is in series with capacitor 56 and the voltage source 61.

The voltage $E_G$ which builds up across capacitor 56 upon completion of either of its charging circuits by a corersponding one of the directional relays 41R, 41L is utilized progressively to reduce the gain of one or more stages of amplifier 30. Specifically, in the system illustrated, the capacitor 56 is continuously connected across the voltage-divider resistance means 64, 65 having a contact or tap 65A connected to the base of transistor 66 in the final stage 30F of amplifier 30. The capacitor 56 and voltage-divider 64, 65 provide a gain-control circuit for amplifier 30.

During charging of capacitor 56, the DC base potential of transistor 66 becomes increasingly negative with corresponding progressive reduction in magnitude of the amplified AC input signal as applied via transformer 67 to discriminator 40. When the gain has been so far reduced that, for the existing AC input signal of amplifier 30, it is incapable of maintaining the selected directional relay 41R or 41L in energized state, the drop-out of its contact 57 or 58 breaks the corresponding charging circuit for capacitor 56. The resultant closure of relay contact 59 or 60 completes a discharge circuit for capacitor 56 through the resistor 70. In consequence, concurrently with termination of energization of drive motor 15, the gain-control voltage across capacitor 56 begins to fall at a rate dependent upon the time-constant $CR_D$, where $R_D$ is the effective resistance value of resistor 70.

When the resultant progressive increase in gain of stage 30F is such that the amplified input signal is again sufficient to pull in the selected directional relays 41R, 41L, the motor 15 is again energized and another charge—discharge cycle of capacitor 56 is initiated.

Thus, until the furnace pressure or other control variable is restored to set-point, the energy to motor 15 is pulsed: the ratio of energized to deenergized time being an inverse function of the displacement of the final-control element 11 from its new balance position. The pulse-repetition frequency is preset by adjustment of resistor 70, and may, for example, be in the range of from 0.5 to 20 cycles per second.

For either direction of rotation of motor 15, the extent to which the gain of amplifier 30F can be reduced during cyclic charging of capacitor 56 through either of its charging circuits, is preset by a network comprising the diode 71 and a back-biasing circuit therefor including the voltage-divider resistor 72, the transistor 73 and emitter-resistor 74. The voltage-divider 72 is connected across the DC source 61 of charging current with its adjustable contact 72 connected to the base of transistor 73. The reversely-poled diode 71 is connected across capacitor 56 in series with the emitter-resistor 74 of transistor 73. The transistor 73 serves as an impedance matching device or emitter-coupled DC amplifier between the diode 71 and the high impedance back-biasing source 72. The diode 71 is non-conductive until, during charging of capacitor 56 at either of its preselected rates, the negative voltage $E_G$ across capacitor 56 exceeds the preselected back-bias of the diode plus the forward voltage drop of the diode. When the negative charge on capacitor 56 exceeds such limit, the diode 71 becomes conductive and the gain-control voltage at terminal 65A of amplifier 30 ceases to rise.

When, or so long as, the input signal to amplifier 30 is sufficient to maintain continued excitation of the selected directional relay at the reduced gain limit set by biased diode 71, the motor 15 is continuously energized and runs at maximum speed in the direction determined by the phase of the AC input signal. When the input signal becomes insufficient, the selected directional relays drops out at the level preset by the back-biased diode 71, whereupon capacitor 56 discharges at a rate substantially proportional to the effective value $R_D$ of resistor 70. Upon discharge of the capacitor 56 with consequent restoration of amplifier gain, the selected directional relay is again pulled in and the pulse cycle repeats. So long as the condenser-charging time is less than the time-constant $CR_R$ or $CR_L$ of the charging circuit involved, the charging curve is substantially linear; so long as the reduction in amplifier gain is substantially linear with increasing values of capacitor voltage $E_G$, the pulse-width time ($t_n$) is a linear function of the AC input signal to the amplifier; so long as the motor acceleration time is small (the motor stopping between successive pulses), and the relay-hysteresis remains constant, the average speed will be directly proportional to the pulse frequency and will vary as the square of the pulse-width. Thus, the motor speed decreases rapidly as the final-control element approaches its balance position and eventually moves to the balance position in small discrete steps.

In the impulse feedback circuit 55, the dial 75 of potentiometer resistor 72 provides for adjustment of the maximum value of gain-control voltage that can be fed back to amplifier 30 and thereby provides an adjustment of the dynamic range of the impulse feedback, i.e., how far away from the desired balance position of the final-control element will the input to motor 15 start pulsing for speed reduction. The dial 76 for resistor 70 provides for adjustment of the discharge time of capacitor 56 and thereby an adjustment of the frequency of pulsing. The dials 77, 78 provide for independent adjustments of potentiometer resistors 62, 63 and thereby provide for selection of different rates of charging of capacitor 56 to meet different motor torque requirements when the load is driven in opposite directions so as to obtain substantially the same repositioning accuracy of the final-control element for either sense of deviation of the control variable from set-point despite dissymmetry of the load characteristic on the motor. These dials, or equivalent adjusting means, provide for tuning of the feedback loop between the output of amplifier 30 (as represented by the state of relays 41R, 41L) and its AC signal input as appearing at the gain-controlled stage or stages. By such tuning, a positioning accuracy of ±0.25% has been readily obtained, and in many instances accuracies of better than ±0.1% have been achieved for loads requiring up to 3,000 lbs./foot torque.

By way of example, suitable components and values for the feedback circuit 55 and the associated amplifier stage 30F are given in Table A below.

TABLE A

Diode:
    71 _____cer__ 69

Resistors:
    62 (max) _____ohms__ 10K
    63 (max) _____do____ 10K
    64 _____do____ 18K
    65 _____do____ 10K
    70 (max) _____do____ 10K
    72 (max) _____do____ [1] 2K
    74 _____do____ 150
    79 _____do____ 150K
    80 _____do____ 39

[1] Plus 3900 ohms.

Source:
    61 _____volts DC__ 30
    82 _____do____ 18

Transistors:
    66 _____ 2N2923
    73 _____ 2N1038

Capacitors:
    56 _____mfd__ 80
    81 _____mfd__ 10

It will be understood the invention is not limited to the specific arrangements illustrated and described, but includes equivalents and modifications within the scope of the appended claims.

What is claimed is:

1. An impulse feedback arrangement for a position-control system in which a reversible motor repositions a final-control element to minimize a deviation-signal, said deviation-signal and a position-related signal jointly providing the input signal of an amplifier whose output selectively energizes directional relays to effect energization of the motor in corresponding sense, said arrangement comprising a gain-control network connected to the input of at least one stage of said amplifier and including capacitance means, two charging circuits for said capacitance means respectively including normally-open contacts of the selectively energized one of said directional relays, the corresponding one of two independently adjustable resistance means, and a DC voltage source, the selective energization of said relays and charging of said capacitance means effecting reduction of amplifier-gain at either of two rates respectively determined by the settings of said two adjustable resistance means, a discharge circuit for said capacitance means including normally-closed contacts of said directional relays, the deenergization of the selected relay and motor and therefore the discharge of said capacitance means occurring when the controlled amplifier-gain falls to a value for which the existing amplifier input is insufficient, such that for a given input signal the amplifier output is insufficient for energization of said relay, the discharge of said capacitance means effecting an increase of the amplifier-gain until the output signal is again sufficient to energize said relay whereupon said motor is again pulse-excited and said capacitance means again begins to charge thereby to reduce the amplifier gain, and the above continuing repetitively such that as the final control element approaches balance the input signal decreases thereby reducing the periods of energization of said relays and the pulse-width of excitation of said motor, the rates of pulse-width decrease depending upon the sense of motor energization and being independently adjustable by settings of said two adjustable resistance means.

2. An impulse feedback arrangement as in claim 1 in which the two independently adjustable resistance means are two potentiometers connected in parallel to the source of charging current and having relatively adjustable contacts respectively connected to the normally-open contacts of said directional relays.

3. An impulse feedback arrangement as in claim 1 in which said discharge circuit for said capacitance means includes resistance means adjustable to preset the repetition frequency of the pulses.

4. An impulse feedback arrangement as in claim 1 which additionally includes a diode and biasing means therefor effectively connected in series across said capacitance means, said biasing means being adjustable to preset the minimum level of the AC input signal above which the selected directional relay remains continuously energized by the amplifier output.

5. An impulse feedback arrangement as in claim 4 in which the diode-biasing means comprises an emitter-coupled transistor having its emitter-circuit resistance in series with said diode across said capacitance means, and means providing an adjustable DC bias for the base of said transistor.

6. An impulse feedback arrangement as in claim 5 in which the base-bias means is a potentiometer resistor con- 7. An impulse feedback arrangement for a position-control system in which a reversible motor repositions a final-control element to minimize a deviation signal, said deviation-signal and a position-signal jointly providing the input signal of an amplifier whose output selectively energizes directional relays to effect energization of the motor in corresponding sense, said arrangement comprising a gain-control network connected to the input of at least one stage of said amplifier and including capacitance means, two charging circuits for said capacitance means each including normally-open contacts of one of said relays, a source of charging current, and adjustable resistance means, the energization of either relay effecting a charging of said capacitance means thereby resulting in progressive reduction of amplifier-gain at preselected rate, a discharge circuit for said capacitance means including normally-closed contacts of said directional relays, the deenergization of the selected relay and motor and therefore the discharge of said capacitance means occurring when the controlled amplifier-gain falls to a value for which the existing amplifier input is insufficient, such that for a given input signal the amplifier output is insufficient for energization of said relay, the discharge of said capacitance means effecting an increase of the amplifier-gain until the output signal is again sufficient to energize said relay whereupon said motor is again pulse-excited and said capacitance means again begins to charge thereby to reduce the amplifier-gain, the above continuing repetitively such that as the final control element approaches balance the input signal decreases thereby reducing the periods of energization of said relays and the pulse-width of excitation of said motor, the rates of pulse-width decrease depending upon the sense of motor energization and being independently adjustable by settings of said two adjustable resistance means, and means for presetting the minimum input-signal level above which the selected directional relay remains continuously energized by the amplifier output.

8. An impulse feedback arrangement as in claim 7 in which the means for presetting said minimum input-signal level comprises a diode and variable biasing means therefor effectively connected in series across said capacitance means.

9. An impulse feedback arrangement as in claim 8 in which the diode is connected in series with the output resistor of an emitter-coupled transistor whose base-bias is derived from a potentiometer resistor connected across the source of charging current for said capacitance means.

10. A system for repositioning a motor-driven final-control element to minimize deviations of a controlled variable from a set-point comprising an amplifier having two output circuits respectively including directional relays for controlling the energization and direction of rotation of the drive-motor for said final-control element, means for supplying to said amplifier an AC signal related in phase and amplitude to the deviation of said variable and the position of said final-control element, and means for effecting pulse-excitation of the drive-motor during approach of the final-control element to its balance position with two independently adjustable rates of decrease of pulse-width for opposite directions of approach, the selective energization of said relays effecting reduction of amplifier-gain at either of the two rates respectively determined by the settings of two independently adjustable resistance means.

11. A system as in claim 10 in which the last-named means comprises a gain-control network including capacitance means continuously connected to the input of at least one stage of said amplifier, two charging circuits for said capacitance means respectively including a DC voltage source, the normally-open contacts of the selected one of said directional relays, and the corresponding one of two independently adjustable resistance means, and a discharge circuit for said capacitance means including normally-closed contacts of said directional relays, the deenergization of the selected relay occurring each time the controlled amplifier-gain falls to a value for which the existing AC input of the amplifier is insufficient.

12. A system as in claim 11 in which the discharge circuit for said capacitance means includes resistance means adjustable to preset the repetition frequency of the motor-excitation pulses.

13. A system as in claim 11 additionally including means adjustable to preset a minimum level of the AC input signal above which the selected directional relay remains continuously energized, said means comprising a diode and biasing means therefor effectively connected in series across said capacitance means.

14. A system for repositioning a motor-driven final-control element to minimize deviations of a controlled variable from a set-point comprising an amplifier having two output circuits respectively including directional relays for controlling the energization and direction of rotation of the drive-motor for said final-control element, means for supplying to said amplifier an AC signal related in phase and amplitude to the deviation of said variable and the position of said final-control element, a gain-control network for at least one stage of said amplifier, means including contact structure of said directional relays for applying to said gain-control network voltage waveforms having either of two independently adjustable rates of rise, the selective energization of said relays effecting reduction of amplifier-gain at either of the two rates respectively determined by the settings of two independently adjustable resistance means, the rising waveforms being applied by said gain-control network to the input of said amplifier to reduce its output until said relays become de-energized, the de-energization of said relays applying through said contact structure to said gain-control network a voltage waveform having an adjustable rate of decrease, said decreasing waveform being applied by said gain-control network to said amplifier to increase its output until said relays become energized, and repetitive energization and de-energization of said relays occurring in the above manner to provide pulse-excitation of said motor, the pulse-width decreasing at independently adjustable rates depending upon which of said relays is energized during drive of the final-control element from opposite directions toward its balance position.

15. A system for repositioning a motor-driven final-control element to minimize deviations of a controlled variable from a set-point comprising an amplifier having two output circuits respectively including directional relays for controlling the energization and direction of rotation of the drive-motor for said final control element, means for supplying to said amplifier an AC signal related in phase and amplitude to the deviation of said variable and the position of said final-control element, a gain-control network for at least one stage of said amplifier, means including normally-open contact structure of said directional relays for applying to said gain-control network voltage waveforms having two independent adjustable preset rates of rise, the selective energization of said relays effecting reduction of amplifier-gain at either of the two rates respectively determined by the settings of two independently adjustable resistance means, the rising voltage waveform being applied through said gain-control network to said amplifier to decrease its output until said directional relays become de-energized, the de-energization of said relays applying to said gain-control network an adjustable decreasing voltage waveform, the decreasing voltage waveform being applied through said gain-control network to the input of said amplifier thereby to increase its output until said relays again become energized, means for presetting the minimum AC input-signal above which the selected directional relay remains continuously energized by the amplifier output, and repetitive energization and de-energization of said relays occurring for input signals below the preset minimum AC input signal thereby providing intermittent pulse-excitation of the motor, the pulse-width of excitation of said motor decreasing in accordance with the adjustable preset rate of rising voltage waveform applied to said gain-control network by said directional relays as the final-control element is stepped toward balance position from either direction by the motor.

References Cited

UNITED STATES PATENTS

| | | | |
|---|---|---|---|
| 2,454,107 | 11/1948 | Wald | 318—28 |
| 2,724,795 | 11/1955 | Rusler | 318—29 |
| 2,780,760 | 2/1957 | Dion | 318—29 |
| 2,860,298 | 11/1958 | Carlson | 318—29 X |
| 2,714,693 | 8/1955 | Van Eyk | 318—448 |

BENJAMIN DOBECK, *Primary Examiner.*